United States Patent [19]

Shuck et al.

[11] 4,157,528
[45] Jun. 5, 1979

[54] WELLBORE PRESSURE TRANSDUCER

[75] Inventors: Lowell Z. Shuck, Morgantown, W. Va.

[73] Assignee: The United States of America as represented by the United States Department of Energy, Washington, D.C.

[21] Appl. No.: 849,570

[22] Filed: Nov. 8, 1977

[51] Int. Cl.² ........................................... H01L 10/10
[52] U.S. Cl. ..................................... 338/42; 73/151; 73/726; 338/3; 338/4
[58] Field of Search ........................... 338/42, 36, 4, 3; 73/151, 726, 727

[56] References Cited

U.S. PATENT DOCUMENTS

| | | | |
|---|---|---|---|
| 2,703,491 | 3/1955 | Goetz | 73/726 X |
| 3,289,134 | 11/1966 | Laimins et al. | 338/42 X |
| 3,354,716 | 11/1967 | Wiebe et al. | 73/726 X |
| 4,065,970 | 1/1978 | Wilner | 338/42 |

*Primary Examiner*—C. L. Albritton
*Attorney, Agent, or Firm*—Dean E. Carlson; Stephen D. Hamel; Earl L. Larcher

[57] ABSTRACT

Subterranean earth formations containing energy values are subjected to hydraulic fracturing procedures to enhance the recovery of the energy values. These fractures are induced in the earth formation by pumping liquid into the wellbore penetrating the earth formation until the pressure of the liquid is sufficient to fracture the earth formation adjacent to the wellbore. The present invention is directed to a transducer which is positionable within the wellbore to generate a signal indicative of the fracture initiation useful for providing a timing signal to equipment for seismic mapping of the fracture as it occurs and for providing a measurement of the pressure at which the fracture is initiated.

2 Claims, 3 Drawing Figures

WELLBORE PRESSURE TRANSDUCER

The present invention relates generally to apparatus employed in the fracturing of subterranean earth formations and, more particularly, to a transducer which may be inserted into the wellbore so as to provide a signal at the surface indicative of the initiation of the fracture.

In the recovery of energy values, such as petroleum, from subterranean earth formations, it has been a common practice to fracture the earth formation to enchance the recovery of the energy values. The ususal procedure for fracturing the earth formation is to introduce a high-pressure fluid into a wellbore until the pressure of the fluid is sufficient to rupture the subterranean earth formation and extend a fracture therefrom into the earth formation for distances up to several hundred feet. This allows for increased recovery of the energy values due to the increased exposure of the earth formation to drainage paths. During the fracturing procedure, it is desirable to provide a mapping of the fracture with respect to its directional orientation and configuration away from the wellbore. Seismology procedures have been valuable for showing or providing such a description of the fracture as it is initiated and extends away from the wellbore.

In the fracturing operation, the high pressure liquid is introduced into the wellbore and causes the earth formation to split and form a narrow crevice or fracture. After the initiation of the fracture, the pumping of the liquid continues so as to further fracture the earth formation and extend the fracture away from the wellbore. Normally a propping agent, such as sand, is introduced along with the fracturing fluid so as to prop open the fracture after the pressure of the fracturing liquid is terminated. As the earth formation fractures and the fracture propagates away from the wellbore, seismic signals are generated which travel as spherical, dilatational and deviatoric wave trains away from the point of generation. This signal is utilized in appropriate equipment to provide the seismic mapping of the fracture characteristics. The fracturing process has been determined to be a discontinuous operation in which the fracture extends in increments with the pressure of the fluid decreasing between each increment due to the fluid entering the new fracture. The fluid pressure must then be returned to a value sufficient to extend the fracture a further increment. At each increment of fracture extension seismic signals are generated to provide the necessary information for mapping the fracture.

One of the shortcomings of seismic mapping of hydraulically induced fractures in subterranean earth formations is the lack of a suitable timing signal indicative of the initiation of the incremented fractures in the earth formation. Previously, the mechanism by which a signal indicative of the fracture initiation was provided involved a somewhat inaccurate technique in that as the earth fractured the pressure of the fracturing liquid is rapidly reduced at the point of fracture with this reduction in the pressure causing a rarefaction wave to propagate through the fluid to the well head where a pressure gauge may or may not indicate that a pressure drop has occurred depending upon the amplitude of the rarefaction waves, and the attenuation of the waves which varies depending upon the fluid injection velocities, turbulence, and proppant densities and distribution along the injection wellbore casing. While the velocity of elastic waves through a given length of a fluid column can be determined, there is considerable turbulence generated in the fluid both along the typical 2,000 to 10,000 ft columns as well as the point of fracture which considerably detracts from the accuracy of this fracture timing mechanism.

Accordingly, it is the primary aim or goal of the present invention to provide an apparatus for generating a signal indicative of the initiation of a hydraulically induced fracture or fractures as will occur in a discontinuous manner in the earth formation at the time each fracture occurs with the small and large signals being provided at the instance of fracture initiation for keying the seismographic or other instrumentation. In addition, the exact waveforms will be preserved without distortion as would occur due to wave propagation through the turbulent fluid column. This aim or goal of the present invention is achieved by using a transducer which is insertable into the wellbore for sensing small or large liquid pressure fluctuations at the site of the proposed fracture which are indicative of the fracture initiation. The transducer of the present invention is an elongated body with a nose cone for facilitating insertion into the wellbore. A chamber within the elongated body is divided into a pair of compartments separated by a diaphragm with at least one strain gauge being affixed to the diaphragm and coupled to suitable instrumentation at the surface. The nose cone has a number of passageways which provides fluid communication with one of the compartments in registry with the diaphragm so that as the pressure of the fluid within the compartment fluctuates, such as decrease in pressure due to the initiation of the fracture, the diaphragm will flex to cause the generation of a signal from the strain gauge. Also, by suitable calibration of the strain gauge, the present invention may be utilized to provide a reading indicative of the liquid pressure required to initiate the fracture through the various fracturing stages until the fracture extension is completed.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for the purpose of illustration and description. The preferred embodiment illustrated is not intended to be exhaustive or to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

Figure 1:
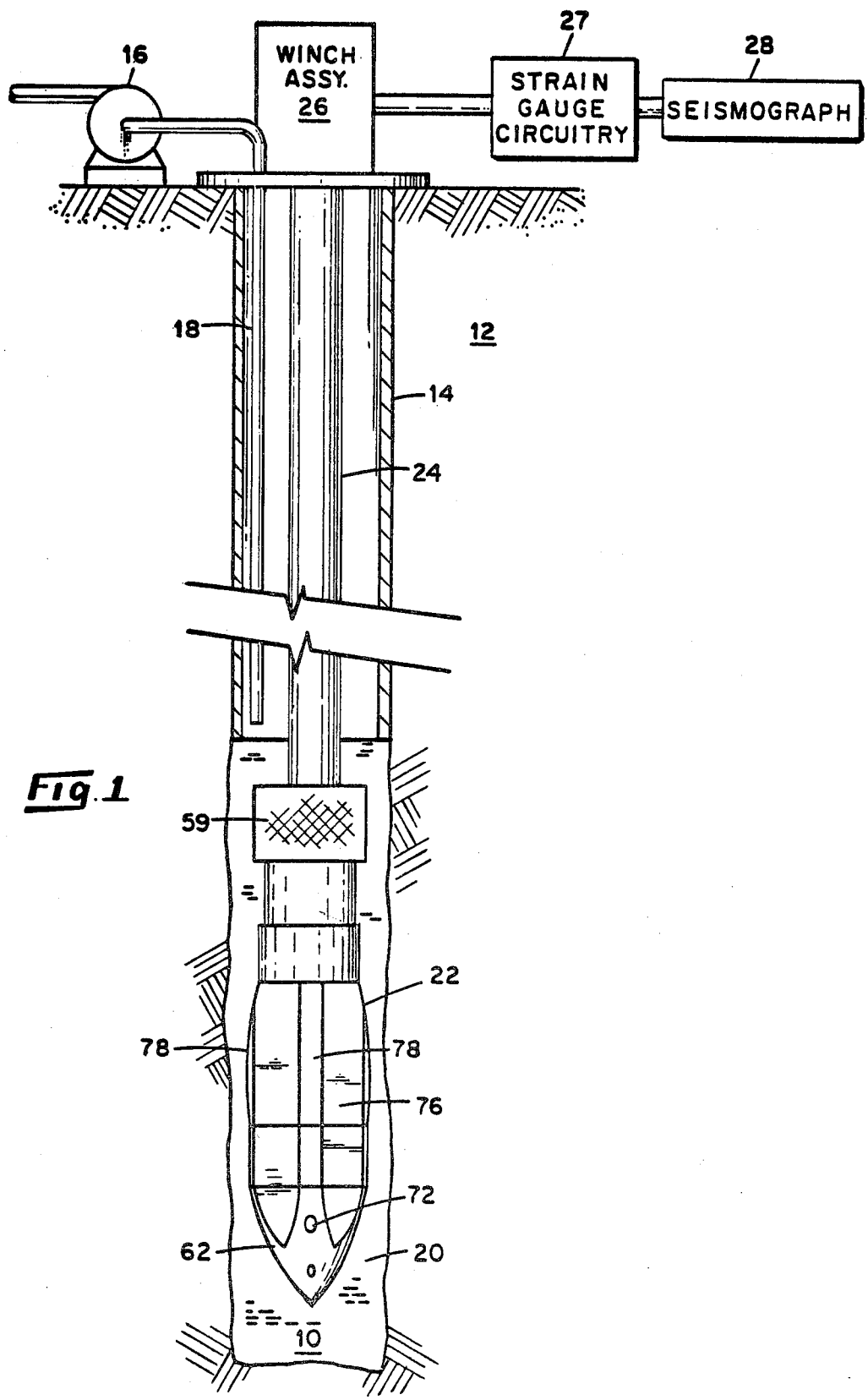
FIG. 1 is a schematic illustration showing the transducer of the present invention in position within a wellbore for providing a signal indicative of the occurrence of a hydraulically induced fracture in the earth formation adjacent to the transducer.

As shown in FIG. 1, a wellbore 10 provided by conventional drilling procedures is shown penetrating an earth formation 12 to a selected depth in the earth formation. Casing 14 is inserted and cemented in the wellbore to a prescribed depth terminating at a location above the desired production area where the fracture is to be hydraulically induced into the earth formation.

In order to hydraulically induce a fracture in the earth formation 12, a pump 16 is utilized to pump a suitable liquid and propping agent through a conduit 18 into the wellbore 10, with this pump being capable of creating sufficient pressure in the wellbore to fracture the earth formation. Normally a liquid pressure in the range of about 4,000 to 12,000 psi is sufficient to fracture the earth formation surrounding the wellbore at depths of 2,000 to 10,000 feet. The liquid 20 used for fracturing the earth formation fills the wellbore and is pressurized by the pump until the liquid reaches the necessary fracturing pressure at which time the fracture occurs and the liquid pressure drops.

The transducer 22 of the present invention is shown suspended in the wellbore by a shielded seven-conductor cable 24, such as normally employed in oil field seismographic operations. The transducer 22 is raised or lowered into the wellbore 10 by a suitable winch assembly as generally shown at 26. The cable 24 couples the transducer 22 through conventional dynamic strain gauge circuitry 27 to suitable instrumentation such as a seismograph generally shown at 28 for receiving and recording the signal, indicative of the initiation of a fracture. This signal may be used in any suitable manner, such as for a timing signal for the seismographic fracturing mapping system.

Figure 2:
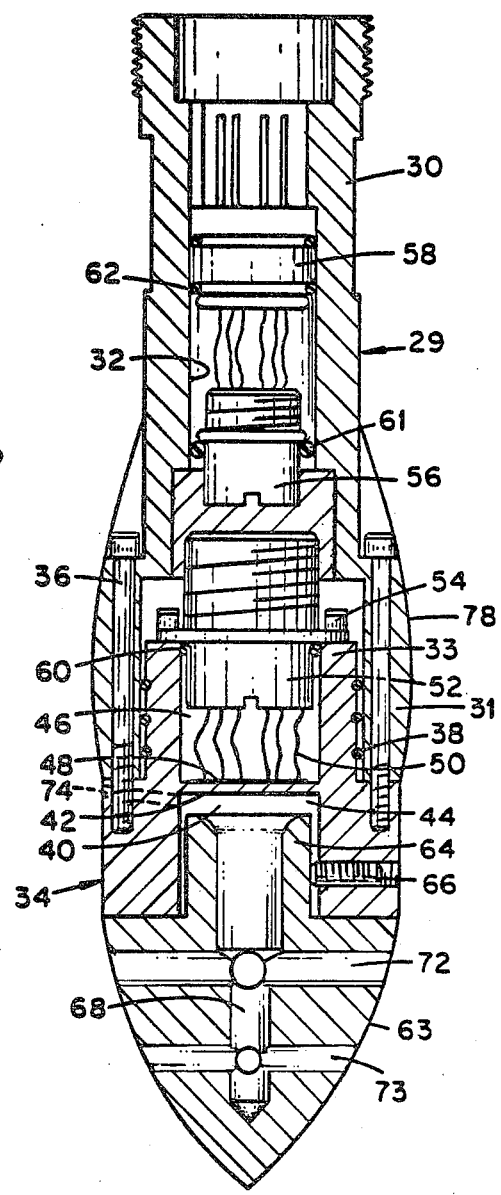
FIG. 2 is an elevational sectional view showing details of the fluid pressure sensing transducer of the present invention.
Figure 3:
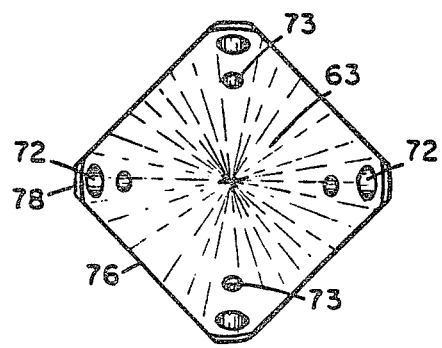
FIG. 3 is a bottom plan view showing the arrangement of passageways penetrating the nose cone of the transducer.

As best shown in FIGS. 2 and 3, the wellbore pressure sensing transducer of the present invention is shown comprising a hollow elongated body 29 of a suitable metal, e.g. stainless steel, having a cylindrical portion 30 and a rectangular portion 31. The rectangular portion 31 of body 29 serves a special function as will be described in detail below. A passageway 32 through the elongated body 29 houses electrical coupling mechanisms and also receives an annular flange 33 on an annular section 34 which is formed of a metal such as stainless steel and is joined to the end of the body 29 adjacent the rectangular portion 31 by bolts 36. O-rings 38 are disposed between the flange 33 and the inner walls of the passageway 32 so as to provide a fluid-type seal between the annular section 34 and the elongated body 29. With the annular section 34 joined to the body 29, a chamber 40 is defined within the annular section 34. A diaphragm 42 bisects or divides this chamber into two compartments 44 and 46. This diaphragm 42 may be machined as an integral part of the annular section 34 or may be emplaced within the chamber by suitable attaching mechanisms, not shown. This metal diaphragm is of a thickness in the range of about 10 to 200 mils and of a diameter of about 0.5 to 2 inches so as to withstand the liquid pressure and yet be sufficiently flexible in response to liquid pressure variations to provide the timing and pressure signals hereinabove referred to. The mechanism by which the pressure fluctuations are determined or measured is achieved by strain gauges 48 disposed in compartment 46 and secured to the diaphragm in any suitable conventional manner such as by epoxy adhesive. With a seven-conductor cable three self temperature compensating strain gauges such as at 48 may be monitored for accurate measurements. The strain gauges employed in the present invention are responsive to frequencies in the range of about 20–80 KHz depending upon diaphragm thickness and diameter so as to provide the necessary signals which would be encountered during a hydraulic fracturing operation. The strain gauges 48 are attached to lead wires 50 projecting from a plug-like connector 52 attached to the annular section 34 by bolts or the like 54 so as to make the annular section 34 with the diaphragm and strain gauge arrangement therein a readily replaceable component. With the insertion of the annular section 34 into the elongated body 29 the plug connector 52 engages a receptacle-type connector 56 continuity for the leads 50. An additional plug connector 58 is mounted in the passageway 32 for coupling the transducer 22 to the shielded conductor cable 24 by an appropriate plug (not shown) on the cable 24. This attachment with the cable is made secure by employing a positive coupling such as the threaded coupler 59 (FIG. 1). O-ring seals 60, 61 and 62 are disposed about the connectors 52, 46 and 58 respectively, to insure that the interior of the transducer remains fluid tight except for the compartment 44.

In order to facilitate insertion of the transducer into the wellbore 10 and to provide a mechanism by which the fracturing liquid 20 may be introduced into the chamber 44, a nose cone 63 is attached to the annular section 34. A hollow central boss 64 on the nose cone 63 projects into the compartment 44 and terminates at a location adjacent to the diaphragm 42. The nose cone 63 is secured in an annular section 34 by any suitable means, such as the set screw 66. The hollow boss 64 is provided with a central passageway 68 projecting from a location near the diaphragm to a location near the point or leading end of the nose cone. The end of the boss which is disposed adjacent to the diaphragm is of a diverging cross-section or flared outwardly so as to assure that pressure waves entering the compartment 44 will be essentially uniform across the diaphragm 42 for affecting the displacement of the liquid over the entire surface of the diaphragm 42 to obtain a more uniform signal from liquid pressure variations and reduce reverberations in the compartment 44 due to pressure fluctuations. The fracturing liquid 20 is introduced into the compartment 44 via longitudinally spaced apart passageways 72 and 73 in the nose cone. These passageways 72 and 73 are each shown as comprising four open-ended bores circumferentially spaced apart in a uniform manner about the nose cone and radially inwardly extending so as to be in registry with the central passageway 68 in the boss 64. The passageways 72 and 73 are longitudinally spaced from one another and about the circumference of the nose cone to assure that the fracturing liquid will readily pass into and out of the compartment 44 through the bore openings in the nose cone regardless of the orientation of the transducer in the wellbore. Since the diaphragm 42 is in essentially a stagnation zone with approximately zero fluid velocities, abrasion of the diaphragm by sand or other propping agents upon the diaphragm will be negligible. Also, such passage positioning maintains a positive and continuously open flow path for the liquid and inhibits plugging of the passageways which may be caused by the propping agent or debris within the wellbore. This free circulation of the liquid into and out of the chamber 44 via the passages 72 and 73 is necessary to achieve the desired signal afforded by the flexing of the diaphragm 42 in response to liquid pressure variations. A vent 74 is provided into the chamber 44 through the annular section 34 to assure that air will not be entrapped in the transducer during the fracturing operation and thereby detract from the function of the transducer.

As briefly mentioned above, the elongated body 29 is provided with a rectangular portion 31. The flat sides 76 of rectangular portion are employed so that when the transducer is within the wellbore, the fracturing liquid may readily flow past the transducer so as to come in registry with the passageways 72 and 73. The corners or edges 78 of the rectangular portion are provided with tapered ends so as to facilitate movement of the transducer in the wellbore and also inhibit the lodging of the transducer in the wellbore.

It will be seen that the transducer of the present invention provides a mechanism by which the fracturing of subterranean earth formations by pressurized liquid may be more readily monitored for facilitating the seismographic mapping as well as the monitoring of the fracturing pressures. The transducer of the present invention is accurate within ±25 psi up to about 5,000 psi with resolution to less than 0.5 psi and is thermally compensated and stable so as to be unaffected by temperature gradients due to different temperature fluids injected into or along the wellbore.

What is claimed is:

1. A liquid pressure-sensing transducer for use in a hydraulic fracturing operation wherein liquid is pumped into a wellbore penetrating a subterranean earth formation and pressurized to induce a fracture in the earth formation surrounding the wellbore, said transducer comprising in combination an elongated housing insertable into the wellbore penetrating the earth formation and having a cone-shaped end portion, a chamber within said housing, a diaphragm disposed in and dividing said chamber into first and second compartments, a hollow boss projecting from said end portion into said first compartment to a location adjacent said diaphragm, passageway means penetrating said housing for placing said first compartment and one surface of said diaphragm in registry with liquid in said wellbore outside of said housing, a portion of said passageway means being provided by a passageway in said hollow boss longitudinally extending from the end of said boss disposed adjacent to said diaphragm to a location in said cone-shaped end portion adjacent the apex of the cone, another portion of said passageway means being provided by a plurality of radially extending and circumferentially spaced apart bores penetrating the surface of the cone-shaped end portion and communicating with the longitudinally extending passageway in the cone-shaped end portion, said end of the longitudinally extending passageway in registry with the end of the boss and disposed adjacent to the diaphragm being outwardly flared for providing said end of the passageway with a diverging cross-section, strain gauge means affixed to said diaphragm on a surface thereof opposite said one surface and in said second compartment, and conducting means connected to said strain gauge for conveying a signal provided by the deflection of said diaphragm in response to variations in the pressure of said liquid in said first compartment.

2. A liquid-pressure sensing transducer as claimed in claim 1 wherein said plurality of bores is provided by two sets of bores in registry with the surface of the cone-shaped end portion at longitudinally spaced apart locations.

* * * * *